United States Patent
Slater (10) Patent No.: US 10,193,214 B2
(45) Date of Patent: Jan. 29, 2019

(54) NEAR FIELD COMMUNICATION ON A SEAMLESS METAL BAND AND METAL BACKED DEVICE

(71) Applicant: MOTOROLA MOBILITY LLC, Chicago, IL (US)

(72) Inventor: Matthew Slater, Elmhurst, IL (US)

(73) Assignee: Motorola Mobility LLC, Chicago, IL (US)

( * ) Notice: Subject to any disclaimer, the term of this patent is extended or adjusted under 35 U.S.C. 154(b) by 57 days.

(21) Appl. No.: 15/223,263

(22) Filed: Jul. 29, 2016

(65) Prior Publication Data

US 2018/0034133 A1   Feb. 1, 2018

(51) Int. Cl.

| H01Q 1/24 | (2006.01) |
|---|---|
| H01Q 5/392 | (2015.01) |
| H01Q 1/22 | (2006.01) |
| H01Q 1/36 | (2006.01) |
| H01Q 1/48 | (2006.01) |

(Continued)

(52) U.S. Cl.
CPC ........... *H01Q 1/243* (2013.01); *H01Q 1/2216* (2013.01); *H01Q 1/2291* (2013.01); *H01Q 1/248* (2013.01); *H01Q 1/36* (2013.01); *H01Q 1/48* (2013.01); *H01Q 5/307* (2015.01); *H01Q 5/392* (2015.01); *H01Q 5/40* (2015.01); *H01Q 7/00* (2013.01); *H04B 5/0031* (2013.01)

(58) Field of Classification Search
CPC   H01Q 1/243; H01Q 1/22; H01Q 5/39; H01Q 1/36
USPC ....................................................... 343/702
See application file for complete search history.

(56) References Cited

U.S. PATENT DOCUMENTS

| 4,673,363 A * | 6/1987 | Hudson .................. B29C 49/20 |
|---|---|---|
| | | 264/516 |
| 2003/0020662 A1* | 1/2003 | St. Hillaire .............. H01Q 1/38 |
| | | 343/770 |

(Continued)

FOREIGN PATENT DOCUMENTS

| EP | 2940787 A1 | 11/2015 |
|---|---|---|
| WO | 2013147823 | 10/2013 |

OTHER PUBLICATIONS

Del Prete, Massimo, et al., Exploitation of a Dual-Band Cell Phone Antenna for Near-field EPT, Department of Electrical Engineering and Information, University of Bologna, IEEE, May 2015.

(Continued)

Primary Examiner — Huedung X Mancuso
(74) Attorney, Agent, or Firm — Yudell Isidore PLLC (57) ABSTRACT

A method and a mobile device that provides near field communication and wireless powering capabilities by coupling a one-piece metal back and a metal band to a device housing to form a device. The device is configured to provide at least one antenna keep-out area. The metal band is adapted to be a dual-band antenna that is coupled to a coil. The coil, operable as one of a near field communication coil and a wireless power transmission coil, forms an overlapping trace with the dual-band antenna along at least one physical area. The coil and the dual-band antenna are positioned in the antenna keepout area and around the perimeter of the device. The method further includes forming at least two turns in the coil. At least one diplexing component is coupled both to the coil and to the dual-band antenna.

18 Claims, 7 Drawing Sheets

(51) Int. Cl.
*H04B 5/00* (2006.01)
*H01Q 7/00* (2006.01)
*H01Q 5/307* (2015.01)
*H01Q 5/40* (2015.01)

(56) References Cited

U.S. PATENT DOCUMENTS

| | | | | |
|---|---|---|---|---|
| 2008/0300658 A1* | 12/2008 | Meskens | ............... | A61N 1/08 607/60 |
| 2010/0061040 A1* | 3/2010 | Dabov | ............... | G06F 1/1626 361/679.01 |
| 2010/0222010 A1* | 9/2010 | Ozaki | ............... | H02J 5/005 455/77 |
| 2011/0303358 A1* | 12/2011 | Farahani | ............... | G06F 1/181 156/285 |
| 2014/0152516 A1* | 6/2014 | Kim | ............... | H04B 5/0031 343/720 |
| 2014/0266917 A1* | 9/2014 | De Luis | ............... | H01Q 19/005 343/700 MS |
| 2015/0036760 A1* | 2/2015 | Pang | ............... | H04B 7/0413 375/267 |
| 2016/0352014 A1* | 12/2016 | Chen | ............... | H01Q 1/243 |
| 2017/0047950 A1* | 2/2017 | Chen | ............... | H01Q 1/243 |
| 2017/0133742 A1* | 5/2017 | Liu | ............... | H01Q 1/2266 |
| 2017/0179573 A1* | 6/2017 | Konanur | ............... | H01Q 1/2291 |
| 2018/0059722 A1* | 3/2018 | McClure | ............... | G06F 1/1656 |

OTHER PUBLICATIONS

Lee, Wang-Sang, et al., Distance-Insensitive Wireless Power Transfer and Near-Field Communication Using a Current-Controlled Loop With a Loaded Capacitance, IEEE Transactions on Antennas and Propagation, vol. 62, No. 2, pp. 936-940, Feb. 2014.
Tanabe, Yuji et al., "A Small Dual-Band Asymmetric Dipole Antenna for 13.56 MHz Power and 2.45 GHz Data Transmission", IEEE Antennas and Wireless Propagation Letters, vol. 24, pp. 1120-1123, 2014.
Patent Cooperation Treaty (PCT) International Application No. PCT/US2017/044295, International Search Report and Written Opinion, dated Mar. 11, 2017.

* cited by examiner

NEAR FIELD COMMUNICATION ON A SEAMLESS METAL BAND AND METAL BACKED DEVICE

BACKGROUND

1. Technical Field

The present disclosure generally relates to electronic devices and in particular to a method for wireless communication with electronic devices.

2. Description of the Related Art

The technology involved in the design of mobile communication devices is continuously improving. Modern modifications in electrical components have enabled mobile devices to incorporate data transmission and wireless powering capabilities. Available technologies for wireless data transmission include the use of Bluetooth, near field communication, as well as Wireless Fidelity (WiFi). Wireless power transmission has been integrated in some mobile devices for wireless powering. As wireless devices continue to become thinner, and in some cases all-together smaller, electromagnetic coupling between various antennas becomes more difficult to mitigate. The number of steps to manufacture and integrate the multiple components required to perform these advanced mobile device features continue to increase. As the number of manufacturing steps and components increase, so does the cost of manufacturing the mobile devices. But more importantly, the opportunity for error increases.

BRIEF DESCRIPTION OF THE DRAWINGS

The description of the illustrative embodiments is to be read in conjunction with the accompanying drawings, wherein.

DETAILED DESCRIPTION

Disclosed are a method and a mobile device that provides near field communication and wireless powering capabilities by coupling a one-piece metal back and a metal band to a device housing to form a device. The device is configured to provide at least one antenna keep-out area. The metal band is adapted to be a dual-band antenna that is coupled to a coil. The coil, operable as one of a near field communication coil and a wireless power transmission coil, forms an overlapping trace with the dual-band antenna along at least one physical area. The coil and the dual-band antenna are positioned in the antenna keepout area and around the perimeter of the device. The method further includes forming at least two turns in the coil. At least one diplexing component is coupled both to the coil and to the dual-band antenna. The at least one diplexing component enables isolation of operations associated with the dual-band antenna, as well as isolation of operations associated with the near field communication coil.

The above presents a general summary of several aspects of the disclosure in order to provide a basic understanding of at least some aspects of the disclosure. Other systems, methods, functionality, features and advantages of the claimed subject matter will be or will become apparent to one with skill in the art upon examination of the following figures and detailed written description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Figure 1:
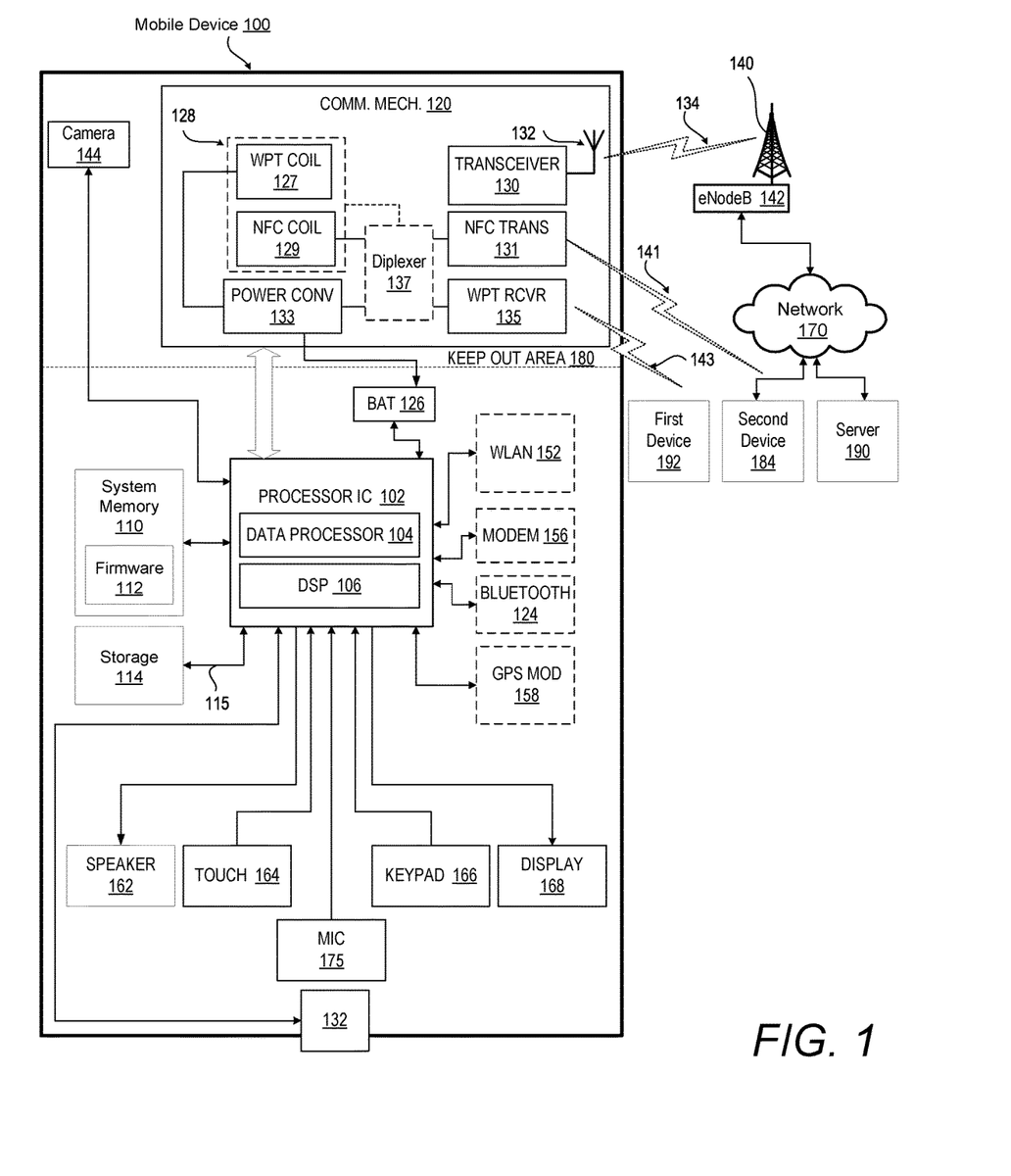
FIG. 1 illustrates a mobile device within which certain aspects of the disclosure can be practiced, in accordance with one or more embodiments.

Those of ordinary skill in the art will appreciate that the hardware components and basic configuration depicted in the following figures may vary. For example, the illustrative components within mobile device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted an example mobile device 100, within which one or more of the described features of the various embodiments of the disclosure can be implemented. In one embodiment, mobile device 100 can be any electronic device such as, but not limited to, a notebook computer, mobile phone, smart watch, camera, video recorder, or tablet.

Mobile device 100 includes at least one processor or processor integrated circuit 102. Included within processor IC are data processor 104 and digital signal processor (DSP) 106. Processor IC 102 is coupled to system memory 110 and non-volatile storage 114 via a system communication mechanism, such as system interconnect 115. System interconnect 115 can be interchangeably referred to as a system bus, in one or more embodiments. System interconnect 115 is utilized to connect at least one component to processor IC 102. Additionally, system interconnect 115 connects one or more components within communication mechanism 120. One or more software and/or firmware modules can be loaded into system memory 110 during operation of mobile device 100. Specifically, in one embodiment, system memory 110 can include therein a plurality of such modules, including firmware (F/W) 112. System memory 110 may also include basic input/output system and an operating system (not shown). The software and/or firmware modules provide varying functionality when their corresponding program code is executed by data processor 104 or by secondary processing devices within mobile device 100.

Processor IC 102 supports connection by and processing of signals from one or more connected input devices such as speaker 162, touch sensor 164, microphone 175, keypad 166, and display 168. Additionally, in one or more embodiments, one or more device interfaces 132, such as an optical reader, a universal serial bus (USB), a card reader, Personal Computer Memory Card International Association (PCMIA) slot, and/or a high-definition multimedia interface (HDMI), can be associated with mobile device 100. Mobile device 100 also contains a power source such as a battery 126 that supplies power to mobile device 100.

Mobile device 100 further includes wireless local area network (WLAN) 152, modem 156, Bluetooth transceiver 124, and global positioning system module (GPS MOD) 158, all of which are in communication with processor IC 102. Modem 156, Bluetooth transceiver 124, and GPS MOD 158 enable mobile device 100 and/or components within mobile device 100 to communicate and/or interface with other devices, services, and components that are located external to mobile device 100. As a wireless device, mobile device 100 can transmit data over wireless network 170. In one embodiment, mobile device 100 may connect to one or more external devices, such as server 190 via wireless network 170.

Mobile device 100 also includes transceiver 130 that is communicatively coupled to processor IC 102 and to antenna 132. Transceiver 130 allows for wide-area or local wireless communication between mobile device 100 and evolved node B (eNodeB) 142 via wireless signal 134 in communication with antenna 140. Mobile device 100 is capable of wide-area or local wireless communication with other mobile wireless devices or with eNodeB 142 as a part of a wireless communication network. For example, mobile device 100 can be communicatively coupled to and in communication with an external device, such as second device 184. Communication with second device 184 may be performed utilizing a communication path involving transceiver 130, antenna 132, wireless signal 134, and eNodeB 142 via antenna 140.

The external casing of mobile device 100 is configured to include a keep out area 180. As shown in FIG. 1, mobile device 100 additionally includes communication mechanism 120, which is at least partially within keep out area 180. As utilized herein, keep out area is a location within mobile device 100 that is absent of components with high metal content. For example, keep out area 180 is void of a printed circuit board ground plane, rear housing metal (e.g. one-piece metal housing), and display grounding. Keep out area 180 may be inclusive of a metal band (e.g. metal band 216), which continues around the periphery of mobile device, as discussed further, in FIG. 2. Additionally, in one or more embodiments, keep out area 180 is inclusive of components with low level metal content (e.g. antennas, connectivity wire, capacitive components). Within communication mechanism 120 are near field communication transceiver (NFC TRANS) 131, wireless power transfer (WPT) receiver 135, power converter 133, transceiver 130, NFC coil 129, wireless power transfer (WPT) coil 127, integrated coil 128, and diplexer 137. NFC transceiver 131 is coupled to NFC coil 129. Transceiver 130 is communicatively coupled to antenna 132. In one embodiment antenna 132 is an integrated dual-band antenna, and antenna 132 enables near field and far field communication for GPS, Bluetooth, and WLAN applications via transceiver 130. Power converter 133 is communicatively coupled to WPT coil 127. Additionally, WPT receiver 135 is communicatively coupled to battery 126 via power converter 133. Diplexer 137 enables WPT coil 127 and NFC coil 129 to share a common communication channel. In one embodiment, the functionality of WPT coil 127 and NFC coil 129 are provided via a single coil, integrated coil 128. Integrated coil 128 is coupled to diplexer 137, and diplexer 137 communicatively connects integrated coil 128 to NFC transceiver 131, as well as to power converter 133 and WPT receiver 135, enabling sequential near field communication operations and wireless power transfer operations to occur. In this embodiment, diplexer 137 is a device that enables frequency-domain multiplexing.

Communication mechanism 120 is connected to processor IC 102, enabling transceiver 130, NFC transceiver 131, and WPT receiver 135 to be communicatively connected with processor IC 102. NFC transceiver 131 allows mobile device 100 to communicate with a similarly equipped device in close proximity or over a short range, such as with second device 184 via wireless signal 141. Additionally, WPT receiver 135 allows mobile device 100 to communicate with a nearby device in close proximity or over a short range, such as first device 192 via magnetic field coupling, as illustrated by magnetic field 143. WPT receiver 135 may receive an alternating current produced subsequent to WPT coil 127 encountering the magnetic field 143 produced by first device 192. This relationship will be further explained in the following sections.

Figure 2A:
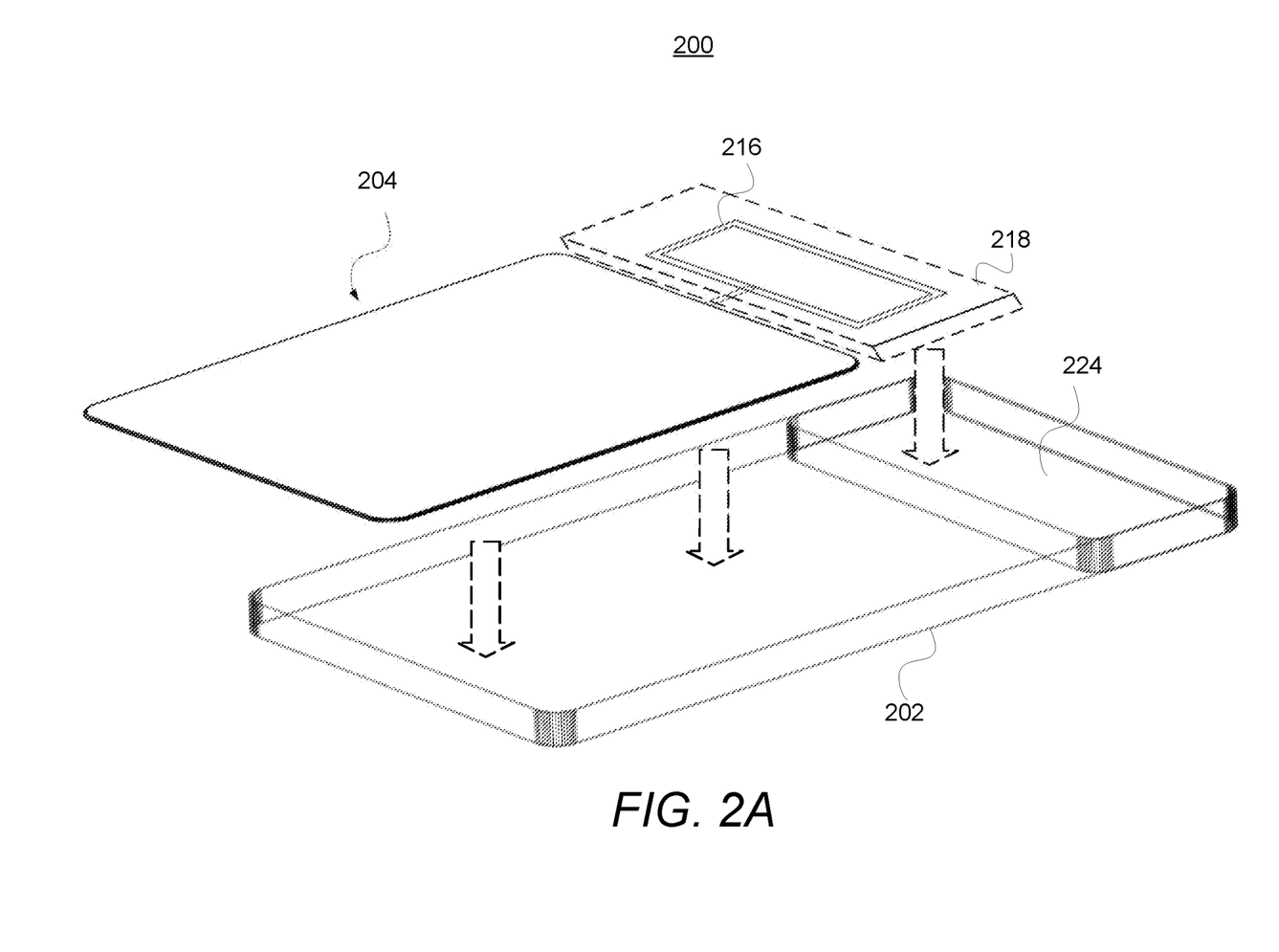
FIG. 2A illustrates a seamless metal band with a metal back configured to be utilized with a mobile device housing component, in accordance with one or more embodiments.
Figure 2B:
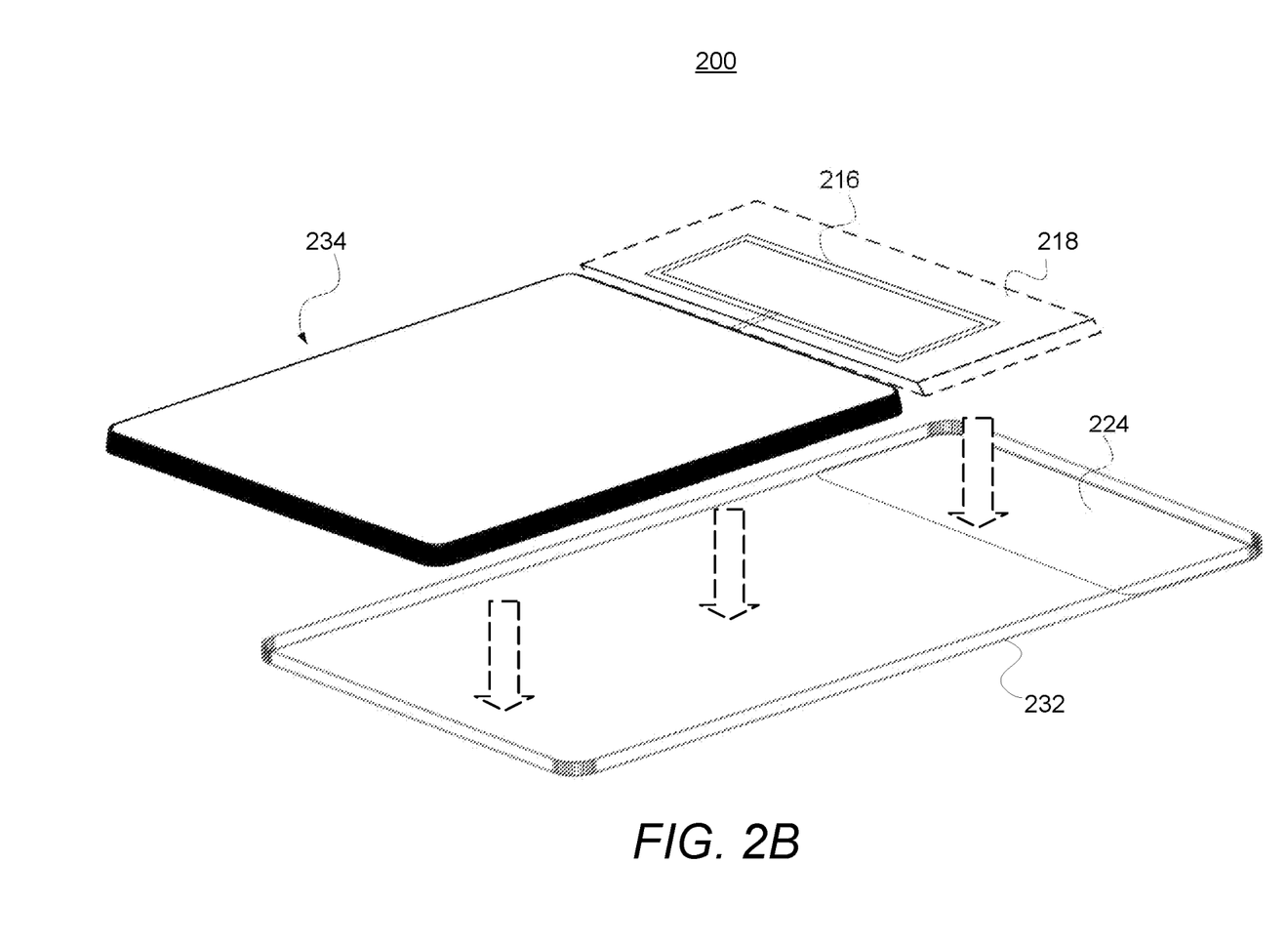
FIG. 2B illustrates a seamless metal band with a metal back configured to be utilized with a mobile device display component, in accordance with one or more embodiments.

Now turning to FIG. 2A and FIG. 2B which illustrate an example mobile device housing 200 within which one or more of the described features of the various embodiments of the disclosure can be implemented. In the description of the following figures, reference will be made to the previously described figures. With reference to FIG. 2A, mobile device housing 200 includes a one-piece metal back 204, metal band 216, and component casing 202. Mobile device 100 comprises one or more keep-out areas, including example keep-out area 224 within component casing 202.

As shown, mobile device housing 200 comprises several structures to house the components of mobile device 100. Specifically, component casing 202 and one-piece metal back 204 are utilized to enclose the components of mobile device 100. In one embodiment, one-piece metal back 204 securely covers the components of mobile device 100, creating a secure housing area for the electrical components of mobile device 100.

Keep-out area 224 provides a separate area within mobile device 100 for metal band 216 and potentially one or more additional components of mobile device 100. Keep-out area 224 is covered by alternate material 218, other than one-piece metal back 204, to avoid and/or reduce electrical interference. In one embodiment, metal band 216 extends across the keep out area to one-piece metal back 204. In one embodiment, component casing 202 includes a screen and/or display (e.g., display 168 of FIG. 1).

Metal band 216 is coupled to one-piece metal back 204. In an exemplary embodiment, metal band 216 and one-piece metal back 204 are manufactured as a single structure. In this embodiment, metal band 216 and one-piece metal back 204 are a seamless structure, wherein one-piece metal back is a seamless metal back and metal band is a seamless metal band that extends from one-piece metal back. In the exemplary embodiment, one-piece metal back 204 and metal band 216 are manufactured without any breaks and are a single conducting unit.

In still another embodiment, metal band 216 comprises one or more of an antenna coil and a second coil. Depending on the specific implementation, the second coil is WPT coil 127, NFC coil 129, or alternatively, integrated coil 128 of mobile device 100 (FIG. 1). At least one coil, specifically the antenna coil of metal band 216, is adapted to function as a dual-band antenna. The dual-band antenna coil of metal band 216 receives and transmits communication signals from among: a global positioning system geo-location service signal, a WiFi communication signal, and a cellular communication signal. Additionally, metal band 216 includes at least one coil, i.e., a second coil, that is adapted to operate as one of a near field communication coil (NFC coil 129), a wireless power transmission coil (WPT 127), and a coil that integrates the functionalities of near field communication and wireless power transmission (integrated coil 128).

Metal band 216 resides in keep-out area 224. In the illustrative embodiment, keep-out area 224 is located in a top area of mobile device 100. Keep-out area 224 may alternatively be located in a bottom, left, or right side of mobile device 100.

With reference to FIG. 2B, mobile device housing 200 includes a one-piece metal back 234, metal band 216, and display casing 232. Mobile device 100 comprises one or more keep-out areas, including example keep-out area 224. As shown, mobile device housing 200 comprises several structures to house the components of mobile device 100. In an alternate embodiment, display casing 232 is a screen, and one-piece metal back 234 is adapted to encompass one or more electrical components of mobile device 100. In this embodiment, keep-out area 224 as well as the one or more components positioned within keep-out area 224 are covered and/or enclosed by a material different from that of one-piece metal back 234, alternative material 218.

Figure 2C:
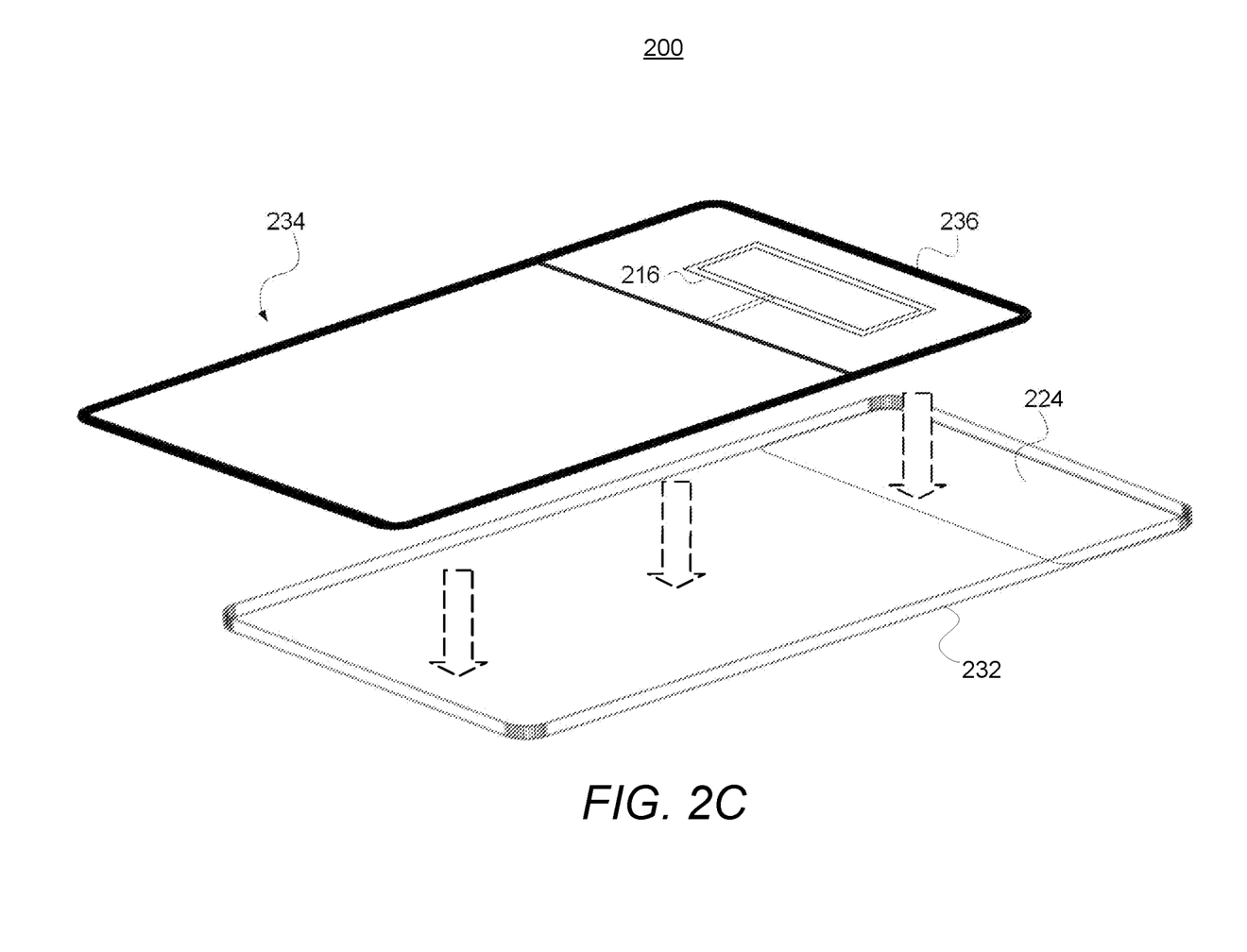
FIG. 2C illustrates a one-piece seamless metal back with a metal band positioned around the perimeter of the device, configured to be utilized with a mobile device housing component, in accordance with one or more embodiments.

With reference now to FIG. 2C, mobile device housing 200 includes one-piece metal back 234 and display casing 232. Mobile device housing 200 comprises one or more keep-out areas, including example keep-out area 224. Metal back 234 includes metal band 216, which continues around the perimeter of mobile device housing 200, as metal band 236. In an exemplary embodiment one-piece metal back 234, metal band 216, and metal band 236 are manufactured as a single metal piece, without any breaks, and are a single conducting unit. Metal band 216 and metal band 236, of one-piece metal back 234, are formed in a shape that accommodates the structure of mobile device housing 200, as well as provides a predetermined metal band length.

Figure 3A:
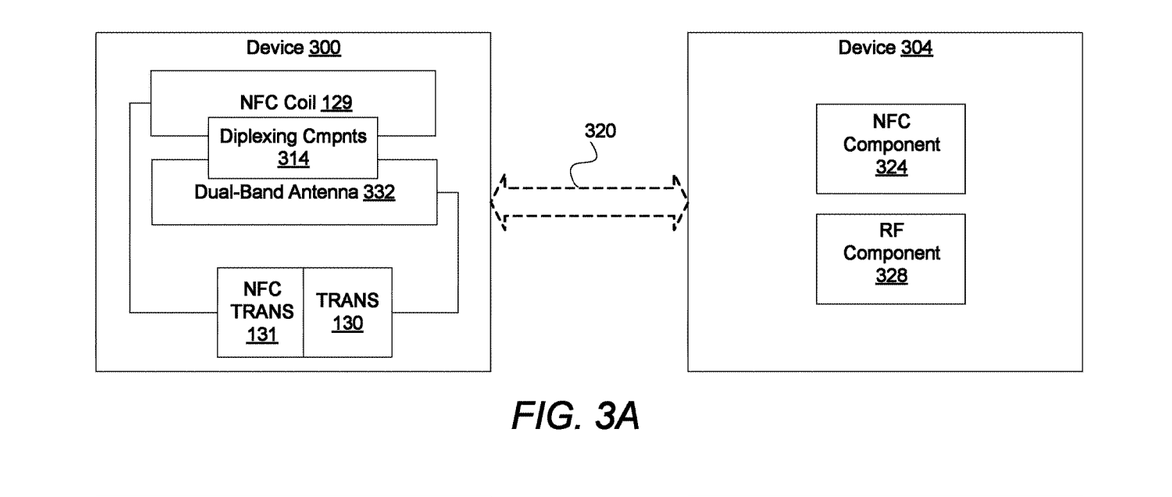
FIG. 3A illustrates example components of a device used for near field communication, according to one or more embodiments.

FIG. 3A is a block diagram illustrating example components of a first device 300, used for near field communication, in communication with a second device. In FIG. 3A device 300 communicates with second device 304 via communication signal 320. Device 300 includes NFC coil 129, dual-band antenna 332, diplexing components 314, NFC transceiver 131 and transceiver 130. Device 304 includes NFC component 324 and radio frequency (RF) communication component 328. Communication signal 320 is illustrative of communication between device 300 and second device 304.

Within device 300, NFC coil 129 is communicatively coupled to NFC transceiver 131. Dual-band antenna 332 is communicatively coupled to transceiver 130. Diplexing components 314 are connected to dual-band antenna 332 and NFC coil 129.

In one embodiment, at least one diplexing component 314 is coupled between dual-band antenna 332 and NFC coil 129. Diplexing components 314 are comprised of one or more capacitive components. In one embodiment diplexing components 314 are utilized to provide a high impedance to ground associated with NFC coil 129, and low impedance to ground associated with dual-band antenna 332. The capacitive elements of diplexing components 314 are coupled to NFC coil 129 and dual-band antenna 332, enabling isolation of operations associated with dual-band antenna 332, as well as isolation of operations associated with NFC coil 129.

In another aspect, device 300 communicates with a second device 304 that has the ability to communicate via near field communication. Signal 320 illustrates communication between device 300 and device 304. More specifically, NFC component 324 enables device 304 to transmit to and/or receive data from NFC coil 129, of device 300, without being in direct contact with device 300, and vice versa. Electromagnetic induction, initiated through the activation of NFC coil 129 and NFC component 324 enables the wireless transmission of data while device 300 is within a predetermined proximity to device 304. In another embodiment, dual-band antenna 332 of device 300 communicates with radio frequency component 328, of device 304, via electromagnetic waves that occupy a different frequency than the electromagnetic wave frequencies of near field communication. The respective transceivers, (NFC transceiver 131 and transceiver 130) as well as diplexing components 314 are operative to ensure NFC coil 129 and dual-band antenna 332 transmit and receive at the predetermined frequencies assigned to each component (129, 332).

Figure 3B:
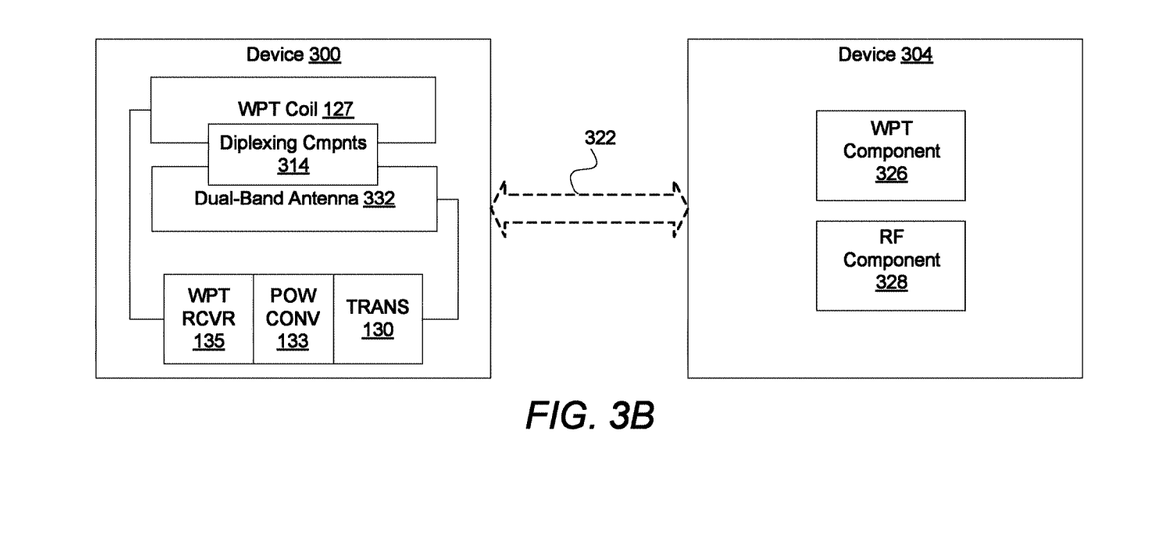
FIG. 3B illustrates example components of a device used for wireless power transmission, according to one or more embodiments.

FIG. 3B illustrates example components of device 300 used for wireless power transmission in communication with a second device, according to one or more embodiments. In FIG. 3B device 300 communicates with second device 304 via magnetic field 322. Device 300 includes WPT coil 127, dual-band antenna 332, diplexing components 314, WPT receiver 135, power converter 133, and transceiver 130. Device 304 includes wireless power transmission component 326 and radio frequency (RF) communication component 328. Magnetic field 322 is illustrative of communication between device 300 and device 304.

Within device 300, WPT coil 127 is coupled to WPT receiver 135. WPT receiver 135 is coupled to power converter 133. Dual-band antenna 332 is coupled to transceiver 130. Diplexing components 314 are connected to dual-band antenna 332 and WPT coil 127.

In one embodiment, at least one diplexing component 314 is coupled between dual-band antenna 332 and WPT coil 127. Diplexing components 314 are comprised of one or more capacitive components. In one embodiment, diplexing components 314 are utilized to provide a high impedance to ground associated with WPT coil 127, and low impedance to ground associated with dual-band antenna 332. The capacitive elements of diplexing components 314 are coupled to WPT coil 127 and dual-band antenna 332, enabling isolation of operations associated with dual-band antenna 332, as well as isolation of operations associated with WPT coil 127.

In another embodiment, electromagnetic fields are utilized to transfer power between device 300 and a second device. Magnetic field 322 illustrates power transfer between device 300 and a power transmitting unit, for example device 304. Device 304 is connected to, or communicatively coupled with, a power source. Device 304 generates a magnetic field. In this embodiment device 300 is the power receiving unit that captures the energy transferred from device 304 and converts the energy into usable power. More specifically, WPT coil 127 (a receiver coil), of device 300, is placed within proximity of a magnetic field generated by device 304. The magnetic field is able to induce an alternating current in WPT coil 127. WPT receiver 135 and/or power converter 133 receive the alternating current and convert the alternating current into direct current. The direct current is transmitted to battery 126 (FIG. 1). In one embodiment, power converter 133 receives the electrical energy directly from WPT coil 127. In another embodiment, power converter 133 may receive the electrical energy from WPT receiver 135.

Figure 4A:
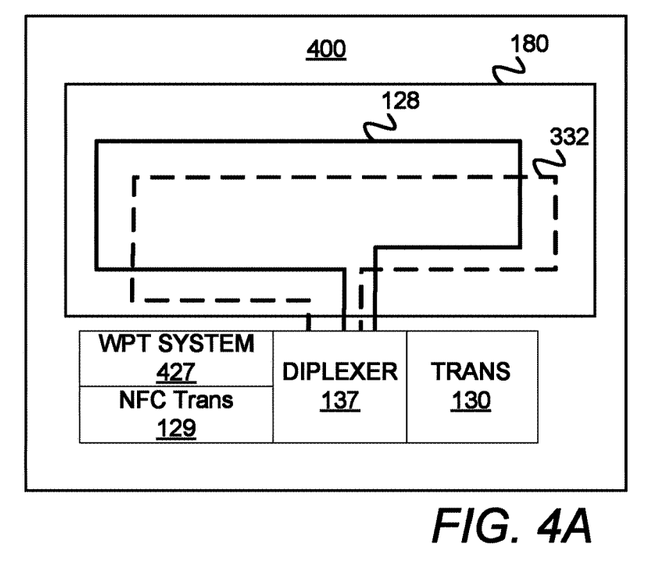
FIG. 4A illustrates an example coil and dual-band antenna, in accordance with one or more embodiments.

FIG. 4A is a block diagram illustrating an example coil and dual-band antenna within communication mechanism 400. Within communication mechanism 400 are keep-out area 180, integrated antenna 128, dual-band antenna 332, WPT system 427, NFC transceiver 129, diplexer 137, and transceiver 130. From among the components within communication mechanism 400, at least integrated coil 128 and dual-band antenna 332 are located within keep-out area 180.

In one embodiment, integrated coil 128 and dual-band antenna 332 are communicatively coupled to diplexer 137. Integrated coil 128 is adapted to provide a secondary device function contemporaneously with wireless communication functions of dual-band antenna 332. In this embodiment, diplexer 137 distributes the received signal to the respective system for processing, enabling both information and energy to be delivered to device 300 concurrently. Specifically, diplexer 137 couples to integrated coil 128 and dual-band antenna 332. Diplexer 137 receives one or more of a dual-band wireless signal (134) from dual-band antenna 332, a near field communication wireless signal (141) from integrated coil 128, and a direct current from the energy transferred by a magnetic field (143) received by integrated coil 128. Diplexer transmits the direct current to wireless power transmission system 427. A dual-band antenna wireless signal and a near field communication signal, received at diplexer 137, are matched to their respective frequencies and distributed to near field transceiver 129 and transceiver 130, respectively. WPT system 427 may include a power converter and a wireless power receiver, without limitation.

In one embodiment, integrated coil 128 and dual-band antenna 332 share at least one overlapping physical trace area. Integrated coil 128 includes the functionality of both NFC coil 129 and WPT coil 127. Integrated coil 128 forms one or more turns. The one or more turns increase the inductance between integrated coil 128 and dual-band antenna 332. From among the at least one overlapping physical trace areas shared by integrated coil 128 and dual-band antenna 332, at least one diplexing component 314 (of FIG. 3) is coupled between integrated coil 128 and the dual-band antenna 332.

Figure 4B:
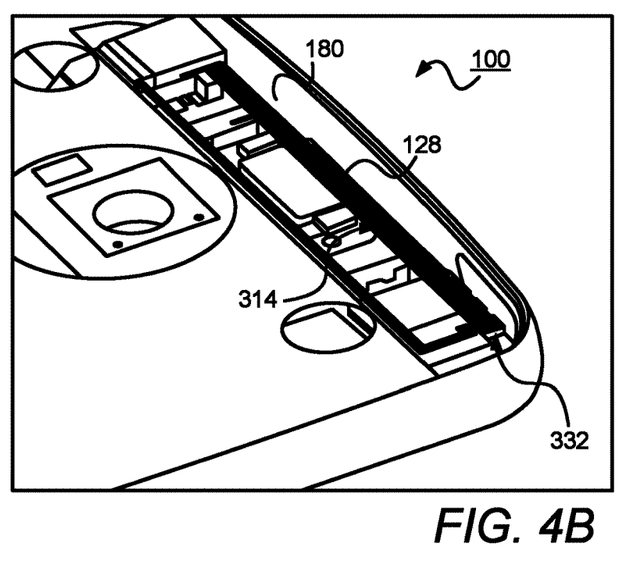
FIG. 4B illustrates an example coil and dual-band antenna diplexed and residing in the keep-out area of a mobile device, in accordance with one or more embodiments.

FIG. 4B illustrates an example coil and dual-band antenna diplexed and residing in the keep-out area of a mobile device. Mobile device 100 includes keep-out area 180, integrated coil 128, dual-band antenna 332, and diplexing components 314 (in between integrated coil 128 and dual-band antenna 332).

In one embodiment, integrated coil 128 is adapted for use as both a near field communication coil and a wireless power transmission coil. Integrated coil 128 is coupled to dual-band antenna 332, sharing at least one overlapping trace area. In one embodiment, the overlapping trace area makes up the entirety of integrated coil 128 and dual-band antenna 332. The diplexing components are coupled to one or more of integrated coil 128 and dual-band antenna 332 at one or more overlapping sections of the coils. In one embodiment, diplexing components 314 are lumped components along the trace of integrated coil 128. The lumped components, such as multi-layer capacitors, are optimized to isolate the received dual-band wireless signal and near field communication signal with respect to the incoming signal frequencies.

Figure 5:
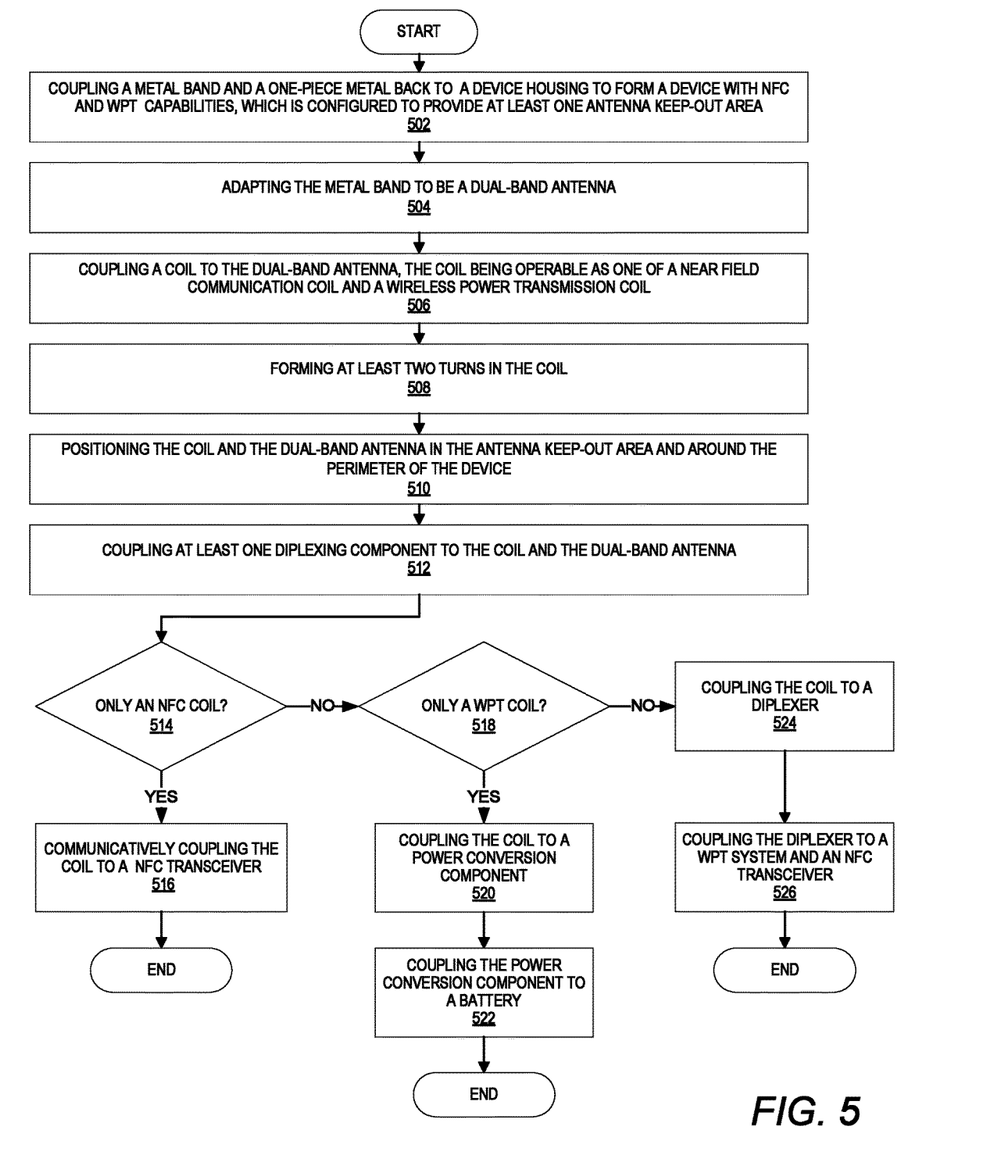
FIG. 5 is a flow chart illustrating a method for coupling a coil and dual-band antenna via diplexing components for use in a mobile device, in accordance with one or more embodiments.

Referring now to FIG. 5, there is depicted a method for coupling a coil and dual-band antenna via diplexing components. Aspects of the method are described with reference to the components of FIGS. 1-4. The method processes described in FIG. 5 generally describe the configuration of one-piece metal back 204 and metal back 216 to form mobile device housing 200.

Method 500 commences at the start block, then proceeds to block 502. At block 502, metal band 216 is coupled to one-piece metal back 204 to form a device with near field communication and wireless powering capabilities, which is configured to provide at least one antenna keep-out area. At block 504, metal band 216 is adapted to be a dual-band antenna. A coil is coupled to the dual-band antenna, at block 506. The coil is operable as one of a near field communication coil and a wireless power transmission coil, where the coil and the dual-band antenna form an overlapping trace along at least one physical area. At least two turns are formed in the coil, at block 508. At block 510, the coil and the dual-band antenna are positioned in the antenna keep-out area. At least one diplexing component is coupled to both the coil and the dual-band antenna, at block 512. At block 514, a decision is made as to whether the coil is only a near field communication (NFC) coil. If the coil is only an NFC coil, at block 516, the coil is coupled to an NFC transceiver. If the block is not only an NFC coil, the method continues to block 518. At block 518, a decision is made as to whether the coil is only a wireless power transmission (WPT) coil. If the coil is only a WPT coil, the coil is coupled to a power conversion component, at block 520. At block 522, the power converter is coupled to a battery. If the coil is not only a WPT coil (and not only an NFC coil), then the coil is an integrated coil, and the integrated coil is coupled to a diplexer, at block 524. At block 526, the diplexer is coupled to a WPT system and an NFC transceiver. The method terminates at the end block.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A device comprising:
a housing including a one-piece metal back coupled to an external component casing, the housing utilized to enclose components of the device, the external component casing configured to include a keep-out area that is covered by a different material from the one-piece metal back to reduce electrical interference for components within the keep out area;
a seamless metal band that extends from the one piece metal back into the keep-out area, the seamless metal band and the one-piece metal back being a seamless structure manufactured as a single metal piece, without any breaks, and are a single conducting unit, the seamless metal band being positioned in the keep-out area of the component casing, the seamless metal band being an antenna coil adapted to function as a dual-band antenna;
a second coil, separate from the antenna coil, the second coil operable as at least one of a near field communication coil and a wireless power transmission coil;
at least one diplexing component coupled to both the second coil and to the antenna coil of the dual-band antenna; and
a transceiver circuit communicatively coupled to the dual-band antenna; and
wherein the second coil is adapted to provide a secondary device function contemporaneously with a wireless communication function of the dual band antenna.

2. The device of claim 1, wherein the coil and the dual-band antenna share at least one overlapping physical trace area.

3. The device of claim 2, wherein the at least one diplexing component is coupled between the coil and the dual-band antenna along the at least one overlapping physical trace area.

4. The device of claim 3, wherein each diplexing component comprises at least one capacitive component which provides a high impedance to ground associated with a near field communication (NFC) coil and a low impedance to ground associated with the dual-band antenna, wherein capacitive elements of duplexing components are coupled to the NFC coil and to the dual-band antenna, enabling isolation of operations associated with the dual-band antenna as well as isolation of operations associated with the NFC coil.

5. The device of claim 1, wherein the second coil is indirectly coupled to the dual-band antenna.

6. The device of claim 5, wherein the second coil forms one or more turns to increase an inductance between the coil and the dual-band antenna.

7. The device of claim 1, wherein the seamless metal band continues around a perimeter of the housing.

8. The device of claim 1, wherein the at least one diplexing component is a multi-layer capacitor.

9. The device of claim 8, wherein the capacitive component is coupled to the coil and enables isolation of an operation associated with the dual-band antenna.

10. The device of claim 1, wherein the coil is a near field communication (NFC) coil and the diplexer is coupled to the NFC coil and an NFC transceiver, wherein the diplexer receives a dual-band antenna wireless signal and a NFC signal, matches the received signals to their respective frequencies, and distributes the received signals to a respective one of a wireless transceiver and the NFC transceiver.

11. The device of claim 1, wherein the coil is a wireless power transmission (WPT) coil and the diplexer is couple to the WPT coil and a WPT system.

12. The device of claim 1, wherein the dual-band antenna is adapted to receive and transmit communication signals from among: a global positioning system geo-location service signal, a WiFi communication signal, and a cellular communication signal.

13. The device of claim 1, wherein the second coil is an integrated coil that is adapted for use as both a near field communication (NFC) coil and a wireless power transmission (WPT) coil and the diplexer couples the second coil to both a WPT system and an NFC transceiver.

14. A method comprising:
coupling, to an external component casing having a keep out area, a one-piece metal back having a seamless metal band that extends from the one piece metal back into the keep out area, the device casing and one piece metal back providing a device housing for enclosing components of the device, the seamless metal band and one-piece metal back being a single seamless structure, manufactured as a single metal piece, without any breaks, and are a single conducting unit, with the metal band extending from the one-piece metal back into the keep out area, the seamless metal band operating as an antenna coil;
adapting the metal band to be a dual-band antenna;
coupling a second coil to the dual-band antenna, the second coil being operable as one of a near field communication coil and a wireless power transmission coil, where the second coil and the dual-band antenna form an overlapping trace along at least one physical area;
positioning the second coil and the dual-band antenna in the antenna keep-out area and around a perimeter of the device;
forming at least two turns in the second coil;
coupling at least one diplexing component to the second coil and the dual-band antenna to enable use of the second coil to provide a secondary device function contemporaneously with a wireless communication function of the dual band antenna.

15. The method of claim 14, wherein the at least one diplexing component is a capacitive component, wherein the coil is an integrated coil that is adapted for use as both a near field communication (NFC) coil and a wireless power transmission (WPT) coil and the diplexer couples the coil to both a WPT system and an NFC transceiver.

16. The method of claim 15, further comprising:
coupling one or more capacitive components between the coil and the dual-band antenna to form an isolated dual-band antenna communication signal, wherein capacitive elements of duplexing components are coupled to the NFC coil and to the dual-band antenna, enabling isolation of operations associated with the dual-band antenna as well as isolation of operations associated with the NFC coil.

17. The method of claim 14, wherein the coil is a near field communication coil, the method further comprises:
communicatively coupling, by the diplexer, the near field communication coil to a near field communication transceiver, wherein the diplexer receives a dual-band antenna wireless signal and a near field communication signal, matches the received signals to their respective frequencies, and distributes the received signals to a respective one of a wireless transceiver and the NFC transceiver.

18. The method of claim 14, wherein the coil is a wireless power transmission coil, the method further comprises:
communicatively coupling, by the diplexer, the wireless power transmission coil to a power conversion component.

* * * * *